UNITED STATES PATENT OFFICE.

GADIENT ENGI AND JAROSLAV FRÖHLICH, OF BASEL, SWITZERLAND, ASSIGNORS TO THE FIRM OF SOCIETY OF CHEMICAL INDUSTRY IN BASLE, OF BASEL, SWITZERLAND.

VAT-DYE FROM INDIRUBIN AND PROCESS OF MAKING SAME.

No. 898,452.   Specification of Letters Patent.   Patented Sept. 15, 1908.

Application filed April 23, 1908. Serial No. 428,761.

*To all whom it may concern:*

Be it known that we, GADIENT ENGI, doctor of philosophy and chemist, a citizen of the Swiss Republic, and resident of Basel, Switzerland, and JAROSLAV FRÖHLICH, doctor of philosophy and chemist, a subject of the Emperor of Austria-Hungary, and resident of Basel, Switzerland, have invented new and useful Vat-Dyes Derived from Indirubin and a Process of Making Same, of which the following is a full, clear, and exact specification.

In the specification of the United States Letters Patent No. 876158 dated January 7, 1908, there is described a manufacture of halogenized dyestuffs which dye in a vat, like indigo, by treating with a halogen or with a halogenizing agent the product of condensation of isatin with indoxyl, called indirubin.

According to the present invention, valuable halogen-derivatives of indirubin may be obtained by condensing a dihalogen-derivative of an isatin with indoxyl or its homologues.

A monobromo derivative of indirubin has already been prepared by Ad. Baeyer by condensing monobromisatin with indoxyl (See *Berliner Berichte*, Vol, XIV page 1745), but this monobromindirubin has no practical interest, since it has not sufficient affinity for cotton and is not sufficient fast to washing and chlorin. On the contrary the dihalogen derivate of indirubin obtained from dihalogenisatin according to the present invention are fast to washing, light and chlorin.

The following example illustrates the invention: A solution of 31 parts of indoxyl in 4000 parts of water, or the mass obtained by heating an equivalent quantity of the potassium salt of phenylglycin and then diluting with water and slightly acidifying with hydrochloric acid, are poured quickly into a solution of 72 parts of dibromisatin and 13 parts of sodium carbonate in 3000 parts of water, care being taken to stir well; the whole is then heated as rapidly as possible to boiling, excess of mineral acid which may be present is neutralized by adding sodium carbonate and the liquid is kept gently boiling for about 2 hours. The mass is allowed to cool and the precipitated dyestuff separated by filtration, washed, to separate any unchanged dibromisatin, first with dilute soda lye and then with hot water, and is pressed and dried.

The dried dyestuff is a brown-red powder which dissolves in concentrated sulfuric acid to a brown-violet solution from which water precipitates the dyestuff as violet flocks. It is sparingly soluble in hot benzene, more easily in hot nitro-benzene to a red-violet solution from which it crystallizes as brown-red needles. Its solution in fuming sulfuric acid of 24 per cent. anhydrid is red-violet; by pouring this solution into ice-water, the dyestuff is precipitated in part without change and remains in part in solution in the form of a red-violet sulfonated dyestuff. In an alkaline hydrosulfite vat, the dyestuff dyes cotton red-violet tints fast to washing, light and chlorin, which are much more reddish than the dyeings obtained with the dibromo-indirubin prepared by bromination of indirubin as prescribed in specification of United States Letters Patent No. 876,158.

In like manner dyestuffs are made by condensing dibromisatin with homologues of indoxyl, as for instance methylindoxyl. The dibromisatin can also be replaced by other dihalogenated isatin-derivatives, as for instance dibromo-alphanaphtisatin, dibromo-betanaphtisatin, dichlorisatin melting at 205–208° C., chlorobromisatin melting at 233 to 234° C., (obtained by chlorinating bromisatin in glacial acetic acid), bromochlorisatin melting at 243 to 246° C. (obtained by brominating chlorisatin in glacial acetic acid), whereby dyestuffs of analogous properties are obtained.

What we claim is:

1. The herein described process for the manufacture of dihalogen derivatives of indirubin, which consists in condensing a dihalogen-derivative of an isatin with an indoxyl compound.

2. As new products, dihalogen derivatives of indirubin, obtainable by the condensation of one molecule of a dihalogenated isatin-derivative with one molecule of an indoxyl-compound, constituting in dry state brownish red powders, dissolving in concentrated sulfuric acid with a dirty brown-violet to violet coloration, dissolving in fuming sulfuric acid of 24 per cent. $SO_3$ with a violet color, being sparingly soluble in hot benzene, more easily in hot nitrobenzene with a violet coloration and yielding, when treated with alkaline reducing agents yellowish vats, dyeing cotton violet tints fast to washing and chlorin.

In witness whereof we have hereunto signed our names this 14th day of April 1908, in the presence of two subscribing witnesses.

GADIENT ENGI.
JAROSLAV FRÖHLICH.

Witnesses:
GEO. GIFFORD,
AMAND RITTER.